United States Patent [19]

Mori

[11] Patent Number: 5,156,430
[45] Date of Patent: Oct. 20, 1992

[54] COUPLING DEVICE
[75] Inventor: Tomohiro Mori, Kurobe, Japan
[73] Assignee: Yoshida Kogyo K.K., Tokyo, Japan
[21] Appl. No.: 810,123
[22] Filed: Dec. 19, 1991
[30] Foreign Application Priority Data Dec. 19, 1990 [JP] Japan .................................. 2-403994
Dec. 19, 1990 [JP] Japan .................................. 2-403995

[51] Int. Cl.$^5$ .......................... A44B 13/02; B66C 1/36
[52] U.S. Cl. ................................ 294/82.23; 24/600.6; 24/600.7
[58] Field of Search ................. 294/82.1, 82.11, 82.16, 294/82.21-82.23, 82.34, 82.35, 89; 24/598.1-598.4, 598.7, 600.4-600.8, 601.6, 612, 615, 698.1

[56] References Cited

U.S. PATENT DOCUMENTS

| 302,509 | 7/1984 | Mauthner | 24/600.6 |
| 677,627 | 7/1901 | Booth | 24/600.8 X |
| 759,805 | 5/1904 | Broga | 24/600.7 |
| 967,486 | 8/1910 | Avery | 294/82.23 X |
| 1,394,068 | 10/1921 | Cousins | 294/82.23 X |
| 1,583,326 | 5/1926 | Waller | 24/600.6 |
| 1,676,167 | 7/1928 | Sprain | 294/82.23 X |
| 3,145,443 | 8/1964 | Gallagher | 24/600.6 |
| 3,365,759 | 1/1968 | Molzan et al. | 24/600.6 |
| 3,861,007 | 1/1975 | Silverman | 24/600.6 |

FOREIGN PATENT DOCUMENTS 57-6184 2/1982 Japan .
57-41461 9/1982 Japan .
57-50906 11/1982 Japan .
61-16821 5/1986 Japan .
63-33549 9/1988 Japan .
210329 3/1990 Japan .

Primary Examiner—Johnny D. Cherry
Attorney, Agent, or Firm—Hill, Van Santen, Steadman & Simpson

[57] ABSTRACT

A coupling device comprises a shaft member having a coupling ring pivotably mounted thereon, a hook, a cylindrical casing and a compression spring. The coupling ring is pivotable into a horizontal position in which the hook, the casing and the spring are removable from the shaft member and into a vertical position in which the hook is rotatable with the casing relative to the coupling ring.

3 Claims, 10 Drawing Sheets

COUPLING DEVICE

BACKGROUND OF THE INVENTION

1. Field of the Invention

This invention relates to a coupling device having a hook for connection with belts, ropes, chains or the like used in lifting or otherwise handling cargoes and other objects.

2. Prior Art

Numerous coupling devices of the above-mentioned character have been proposed, a typical example of which is disclosed in Japanese Utility Model Publication No. 2-10329. This prior device shown in FIG. 13 of the accompanying drawings generally comprises a shaft member 100 carrying on its upper end a coupling ring 101 via a rotary member 102, a cylindrical sleeve 103 vertically movable relative to the shaft 100, a hook 104 disposed at the lower end of the sleeve 103 for anchoring a rope 105 or the like, a coil spring 106 normally biasing the sleeve 103 downwardly, and a stopper member 107 connected to the rotary member 102 and shiftable between the solid line and phantom line positions for releasably holding the sleeve 103 in its lowermost position in which the hook 104 is closed. Such a prior art device has a drawback in that it is made up of so many component parts that their assembly is complicated and time-consuming. It involves mounting the rotary member 102 on the shaft member 100, connecting the rotary member 102 with the coupling ring 101 and the stopper member 107, and putting the hook 104 into threaded engagement with the shaft 100. Another drawback is that since the coil spring 105 and the hook 104 are supported on a support rib 108 formed internally of the sleeve 103 at a position above and remote from a lower end 109 of the sleeve 103 which extends across the U-shaped portion of the hook 104, there is a fear that the rope 105 will push up the lower end 109 of the sleeve 103 and disengage from the hook 104 in the event that the stopper member 107 fails to properly function under the influence of external pressure or shock.

SUMMARY OF THE INVENTION

With the foregoing drawbacks of the prior art in view, the present invention seeks to provide a coupling device which consists of a minimum number of component parts which can be assembled with utmost ease.

The invention further seeks to provide a coupling device with a hook which incorporates means for preventing accidental opening of the hook and hence eliminating possible physical damage to a cargo or bodily injury.

The above and other objects, features and advantages of the invention will become manifest upon reading the following detailed description taken in connection with the accompanying drawings.

According to the invention, there is provided a coupling device comprising: a shaft member having a coupling ring pivotably mounted thereon, the coupling ring being pivotable between a vertical and a horizontal position; a hook removably connected to the shaft member and having a key-groove, a substantially "C"-shaped aperture having an upper marginal edge and an opening communicating with the aperture; a cylindrical casing removably mounted in surrounding relation to the shaft member and having an engaging ridge engageable with the key-groove; and a compression spring received in and normally urging the cylindrical casing downwardly away from the coupling ring.

DETAILED DESCRIPTION OF THE INVENTION

Figure 1:
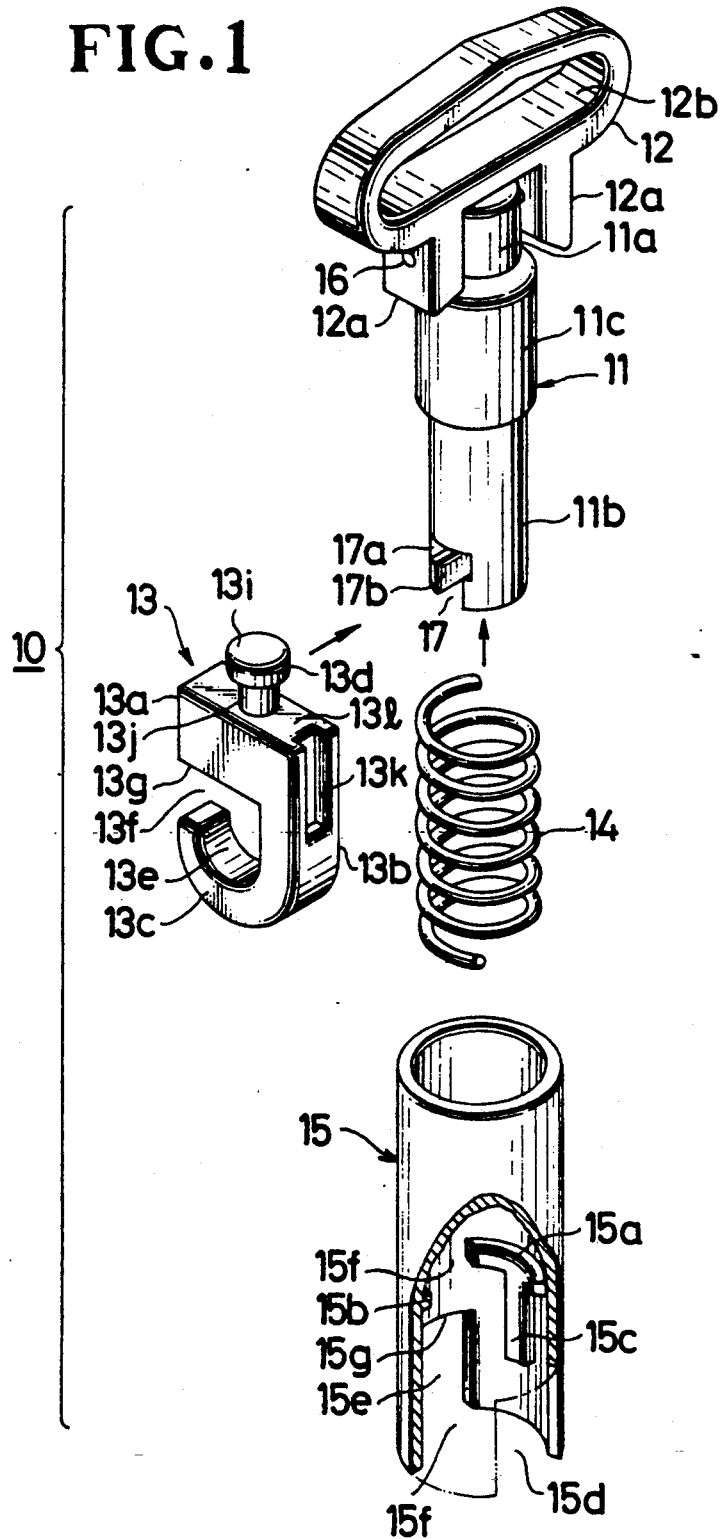
FIG. 1 is an exploded, perspective view of a coupling device embodying the invention.

Referring now to the drawings and FIG. 1 in particular, there is shown a coupling device 10 provided in accordance with the principles of the invention which essentially comprises a support shaft member 11 having a coupling ring 12 mounted on its upper end, a hook 13, a coil spring 14 and a cylindrical casing 15. The support shaft member 11 includes an upper shaft portion 11a and a lower shaft portion 11b which are interconnected by an intermediate shaft portion 11c larger in diameter than the shaft portions 11a, 11b and dimensioned to fit snugly with the cylindrical casing 15. The coupling ring 12 is pivotably connected to the upper shaft portion 11a by a support pin 16 extending between a pair of leg portions 12a of the coupling ring 12. The coupling ring 12 has an aperture 12b for passing and fastening a belt or the like not shown.

A cavity 17 is formed in the lower shaft portion 11b to open peripherally therefrom for receiving the hook 13. The cavity 17 has a large-diameter upper portion 17a and a small-diameter lower portion 17b.

The hook 13 includes a horizontal block portion 13a, a vertical shank portion 13b, and an arcuate anchoring portion 13c defining therebetween a substantially "C"-shaped space or aperture 13e for receiving a rope R or the like (FIG. 2) through an opening 13f communicating with the aperture 13e and defined by the lower surface 13g of the block portion 13a and the upper end surface 13h of the anchoring portion 13c. The hook 13 further includes a bolt portion 13d extending vertically from the horizontal block portion 13a and having a circular head 13i dimensioned to fit in the large-diameter portion 17a of the cavity 17 in the shaft member 11 and a connecting pin 13j dimensioned to fit in the small-diameter portion 17b of the cavity 17. The hook 13 is thus connected through its bolt portion 13d to the support shaft member 11 and supported therein rotatably about its pin 13j. The hook 13 is further provided in the vertical shank portion 13b with a key-groove 13k which opens at an upper end thereof to merge with the upper surface 13l of the block portion 13a and which is adapted to engage with an elongate engaging ridge (later described) of the cylindrical casing 15.

The cylindrical casing 15 has an inside diameter slightly larger than the diameter of the intermediate shaft portion 11c of the shaft member 11 so that the casing 15 is vertically movable relative to the shaft member 11. The casing 15 is provided with a pair of support ledges 15a and 15b extending from its inner peripheral wall in diametrically opposed relation for supporting the lower end portion of the coil spring 14 when the casing 15 is fitted over the shaft member 11. The coil spring 14 is mounted in surrounding relation to the lower shaft portion 11b, with its upper end portion held in abutting engagement with the lower peripheral end of the intermediate shaft portion 11c so that the coil spring 14 normally urges the cylindrical casing 15 downwardly away from the coupling ring 12. Vertically extending from one of the support ledges 15a, 15b is an engaging ridge 15c which is dimensioned to fit with the key-groove 13k of the hook 13 in a manner hereinafter described. The casing 15 is provided at its lower peripheral portion with a pair of diammetrically opposed cut-away recesses 15d, 15e extending in crisscross relation to the pair of support ledges 15a, 15b and defining therewith a channel 15f for the passage of the hook 13.

Figure 2:
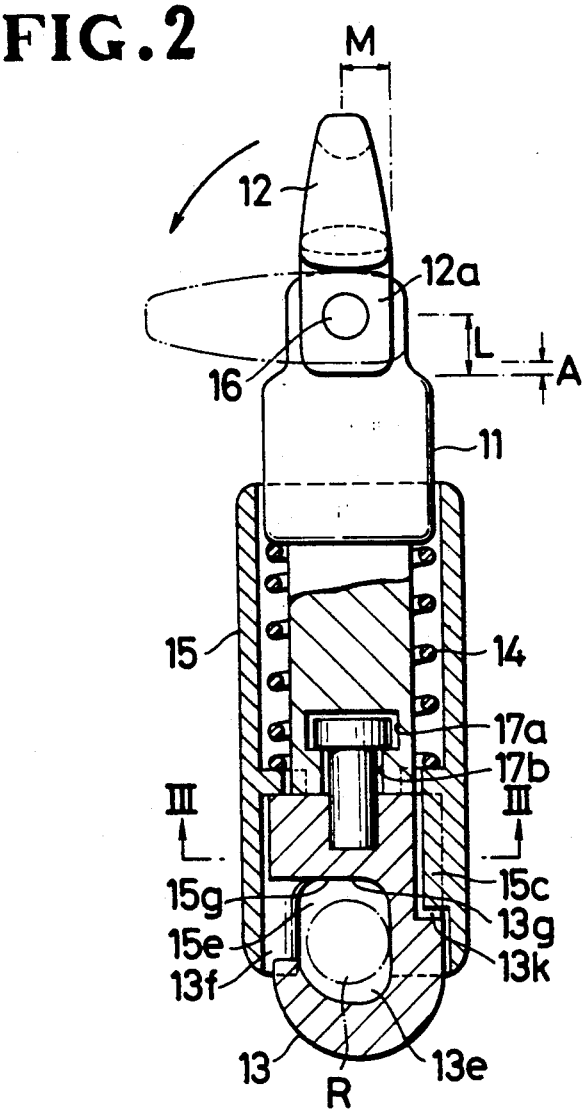
FIG. 2 is a side elevational, partly sectional view of the coupling device showing a hook in closed position.
Figure 3:
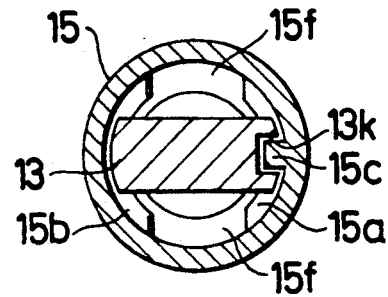
FIG. 3 is a cross-sectional view taken along the line III—III of FIG. 2.
Figure 5:
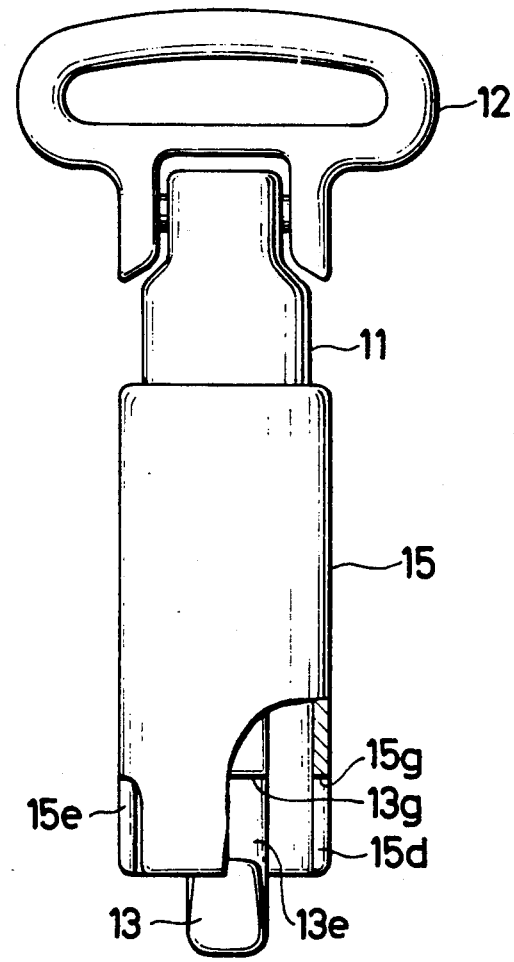
FIG. 5 is a front elevational, partly sectional view of the coupling device showing the hook in closed position.
Figure 6:
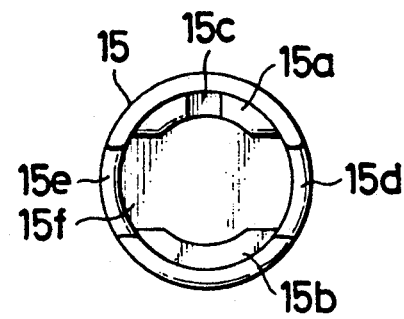
FIG. 6 is a bottom end view of the coupling device.

According to an important feature of the invention, when the opening 13f of the hook 13 is closed by the casing 15, the relative position of the hook 13 and the casing 15 is such that the lower surface 13g (which defines the upper marginal edge of the "C"-shaped space) of the block portion 13a of the hook 13 lies flush with or registers with an upper marginal edge 15g of each of the cut-away recesses 15d, 15e as shown in FIGS. 2 and 5, whereby the risk of the rope R pushing the casing 15 upwardly and becoming disengaged from the hook 13 is eliminated.

Figure 7:
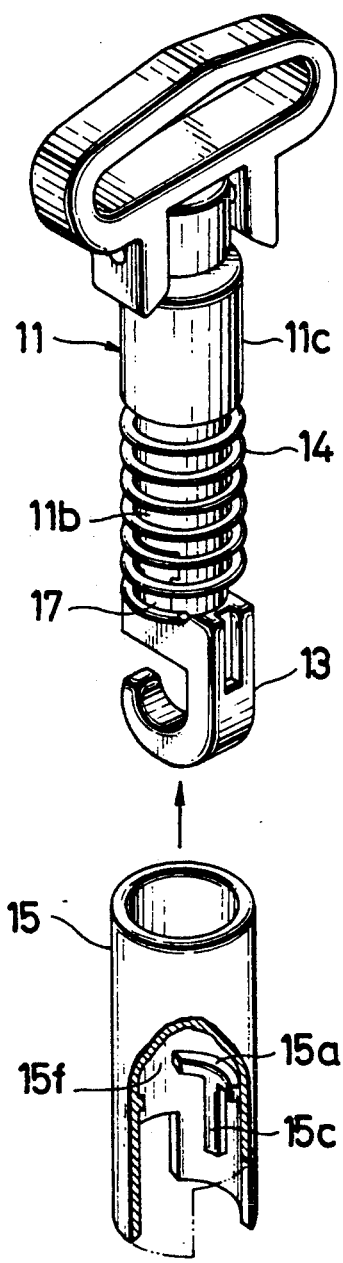
FIG. 7 is a perspective, partly sectional view showing the manner of assembly of the coupling device.
Figure 8:
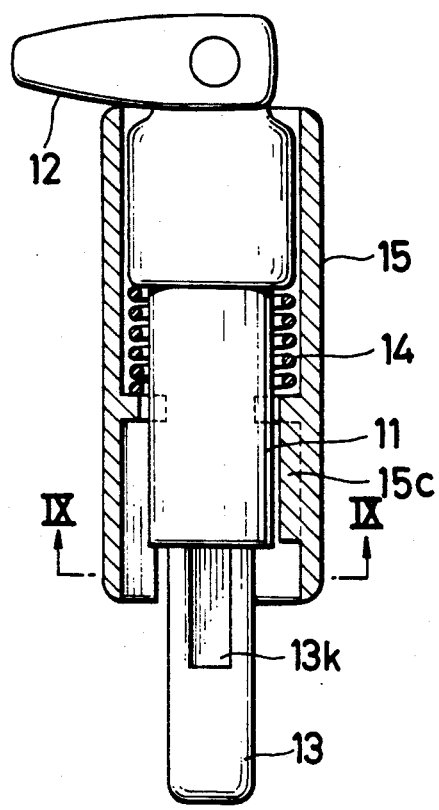
FIG. 8 is an elevational, partly sectional view of the coupling device utilized to explain the assembly and disassembly of the coupling device.
Figure 9:
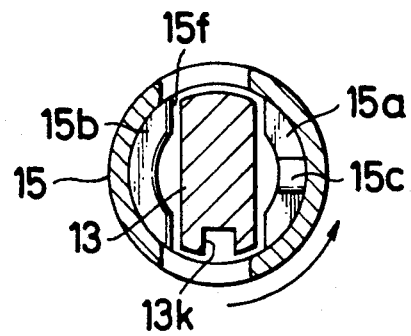
FIG. 9 is a cross-sectional view taken along the line IX—IX of FIG. 8.

When assembling the coupling device 10, the coil spring 14 is fitted over the lower shaft portion 11b of the shaft member 11, followed by compressing the coil of the spring 14 from below until the cavity 17 is cleared for receiving the hook 13 therethrough. With the hook 13 thus applied as shown in FIG. 7, the coupling ring 12 is flipped flat into a horizontal position as shown in FIG. 8 and indicated by the phantom line in FIG. 2, and the casing 15 is mounted over the shaft member 11 with the coil spring 14 compressed to allow the hook 13 to be exposed through and beyond the lower end of the casing 15. In this instance, however, the hook 13 is not in proper operative position and therefore is rotated about 90° as shown in FIG. 9 so as to bring the key-groove 13k into registry with the ridge 15c of the casing 15.

With the key-groove 13k thus registered in line with the ridge 15c, the casing 15 is released so that they are brought into snapping engagement with each other by the tension of the coil spring 14. The coupling ring 12 is now flipped back into its vertical position to complete the assembly as shown in FIG. 2, in which the casing 15 assumes its normal uppermost position with its upper peripheral end borne against the lower ends of the respective leg portions 12a of the coupling ring 12.

Indicated by L in FIG. 2 is a distance between the center of the support pin 16 and the lower end of each of the leg portions 12a of the coupling ring 12. M is a distance between the center of the support pin 16 and the side edge of each of the leg portions 12a. According to another feature of the invention, distance L is greater than distance M by a margin of distance A over which the casing 15 is further raised beyond the normal uppermost position when the coupling ring 12 is flipped down flat as indicated by the phantom line in FIG. 2.

Figure 4:
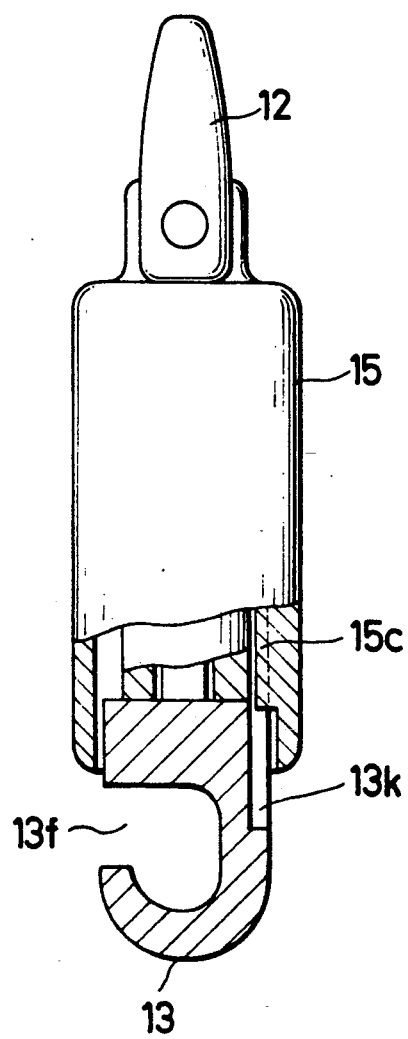
FIG. 4 is a side elevational, partly sectional view of the coupling device showing the hook in open position.

With the coupling ring 12 held in the upright or erected position as shown in FIGS. 2 and 4, the hook 13 has its key-groove 13k partially engaged with the ridge 15c of the casing 15 and hence is vertically movable relative to the casing 15 and also rotatable together with the casing 15 relative to the coupling ring 12. Flipping the coupling ring 12 down flat into the horizontal position indicated by the phantom line in FIG. 2 and as shown in FIG. 8, causes the casing 15 to move further up by distance A by the action of the coil spring 14 until the key-groove 13k of the hook 13 disengages from the ridge 15c of the casing 15 so that the hook 13 is freely rotatable with respect to the casing 15. The hook 13 is thus rotated about 90° in either direction, thereby allowing the same to be removed from the casing 15 together with the shaft member 11.

Figure 10:
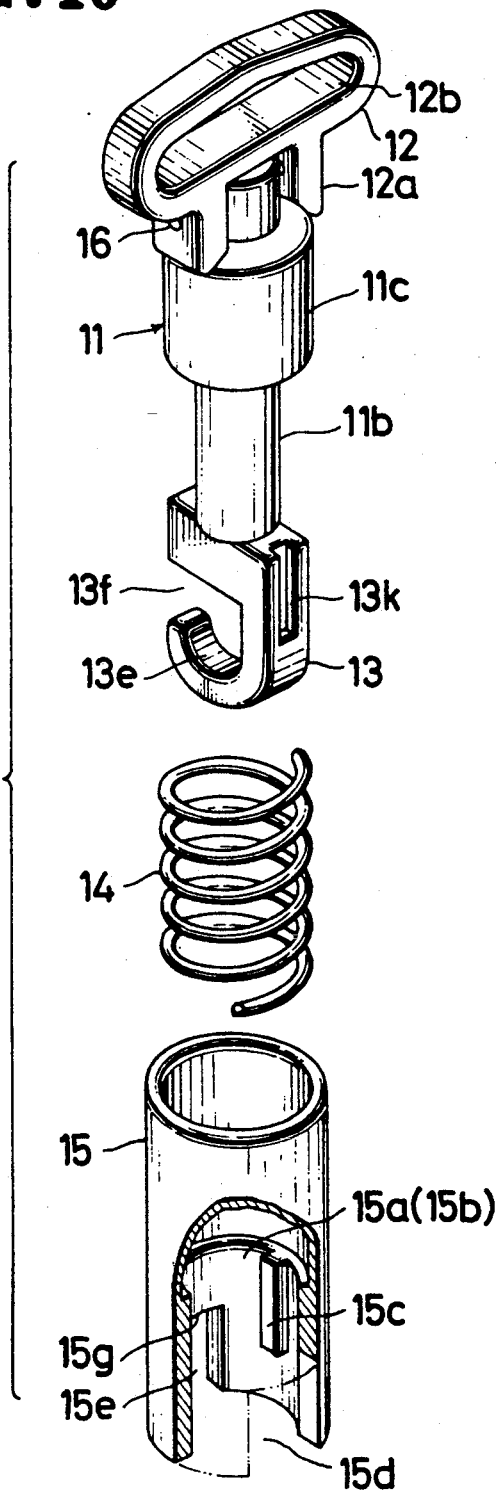
FIG. 10 is a view similar to FIG. 1 but showing a modified form of the coupling device.
Figure 11:
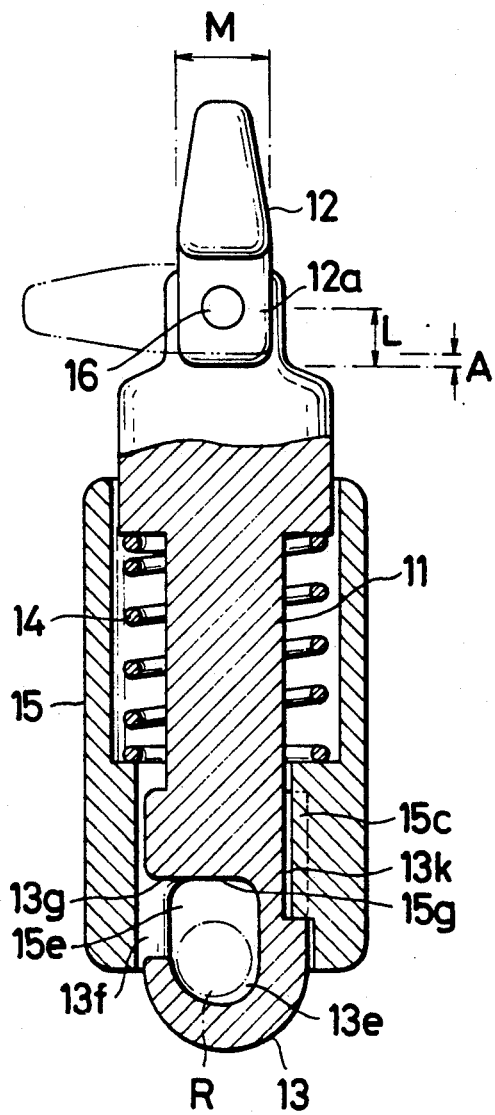
FIG. 11 is a view corresponding to FIG. 2 but showing the modified device of FIG. 10.

FIGS. 10 and 11 show a modified form of a coupling device which is similar in most structural details to the coupling device 10 described in connection with FIGS. 1-9 inclusive, but principally differs in that the hook 13 is formed integrally with the shaft member 11 and is not rotatable relative to the coupling ring 12 and in that the support ledge 15a, (15b) is formed fully around the inner peripheral wall of the casing 15.

Figure 12:
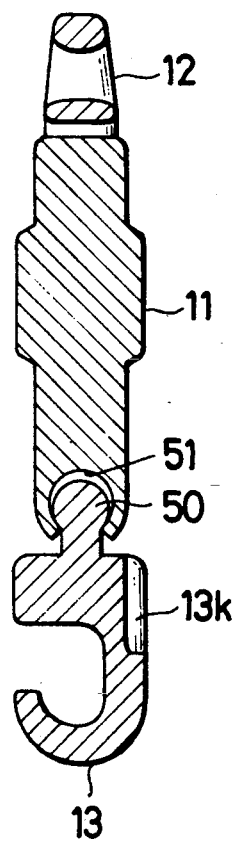
FIG. 12 is a longitudinal cross-sectional view of another modified form of the coupling device.
Figure 13:
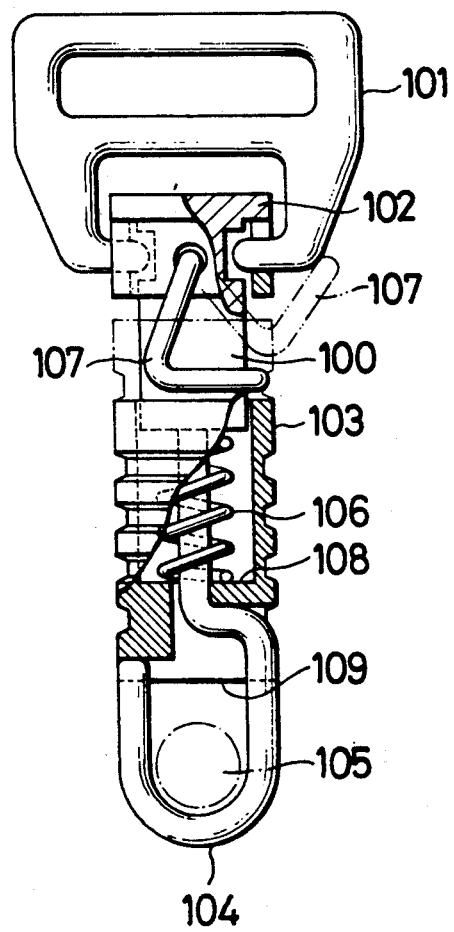
FIG. 13 is a front elevational, partly sectional view of a prior art device.

FIG. 12 shows another modification which is characterized by the provision of a hook 13 having a ball 50 movably received in a circular recess 51 formed in the lower end of the shaft member 11 so that the hook 13 is rotatable relative to the shaft member 11.

Many other modification and changes may be made in the form and construction herein advanced, without departing from the scope of the appended claims.

What is claimed is:

1. A coupling device comprising:
  (1) a shaft member having a coupling ring pivotably mounted thereon, said coupling ring being pivotable between a vertical and a horizontal position;
  (2) a hook removably connected to said shaft member and having a key-groove, a substantially "C"-shaped aperture having an upper marginal edge and an opening communicating with said aperture;
  (3) a cylindrical casing removably mounted in surrounding relation to said shaft member and having an engaging ridge engageable with said key-groove; and and normally
  (4) a compression spring received in and normally urging said cylindrical casing downwardly away from said coupling ring.

2. A coupling device according to claim 1 wherein said cylindrical casing further includes a pair of diametrically opposed cut-away recesses each having an upper marginal edge disposed to register with said upper marginal edge of said "C"-shaped aperture when said opening of said hook is closed.

3. A coupling device according to claim 1 wherein said hook is vertically movable relative to and rotatable with said cylindrical casing relative to said coupling ring when the latter is held in said vertical position, and said engaging ridge is disengageable from said key-groove when said coupling ring is pivoted into said horizontal position.

* * * * *